US007761881B2

(12) United States Patent
Johnson et al.

(10) Patent No.: US 7,761,881 B2
(45) Date of Patent: Jul. 20, 2010

(54) EVENT BOOKMARKS

(75) Inventors: David L. Johnson, Duvall, WA (US); Raymond W. McCollum, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1139 days.

(21) Appl. No.: 11/261,095

(22) Filed: Oct. 28, 2005

(65) Prior Publication Data
US 2007/0100988 A1 May 3, 2007

(51) Int. Cl.
G06F 9/46 (2006.01)
G06F 15/17 (2006.01)
(52) U.S. Cl. .............................. 719/318; 709/224
(58) Field of Classification Search ................. 719/318
See application file for complete search history.

(56) References Cited

U.S. PATENT DOCUMENTS

| | | | |
|---|---|---|---|
| 5,764,961 A | | 6/1998 | Bhat |
| 6,549,956 B1 | | 4/2003 | Bass et al. |
| 6,848,101 B2 | | 1/2005 | Maekawa et al. |
| 6,889,244 B1 | | 5/2005 | Gaither et al. |
| 6,895,084 B1 | | 5/2005 | Saylor et al. |
| 6,941,306 B2 | | 9/2005 | Kim |
| 7,302,481 B1 * | 11/2007 | Wilson ...................... 709/224 |
| 7,321,982 B2 * | 1/2008 | Coatney et al. ................ 714/4 |
| 2003/0167352 A1 | 9/2003 | Hoshiai et al. |
| 2003/0212690 A1 | 11/2003 | Surma et al. |
| 2004/0201685 A1 * | 10/2004 | Seaman et al. ........... 348/207.1 |
| 2005/0086469 A1 | 4/2005 | Dunagan et al. |
| 2005/0190787 A1 | 9/2005 | Kuik et al. |
| 2005/0223108 A1 | 10/2005 | Maffeis et al. |
| 2005/0246622 A1 * | 11/2005 | Ahn et al. ................. 715/500.1 |
| 2006/0080362 A1 * | 4/2006 | Wagner et al. .............. 707/200 |

OTHER PUBLICATIONS

Don Box, Microsoft, et al. "Web Services Eventing (WS-Eventing)", pp. 1-24 Aug. 2004 http://msdn.microsoft.com/webservices/default.aspx?pull=/library/en-us/dnglobspec/html/ws-eventing.asp.
IBM, BEA Systems, Microsoft, Computer Associates, Sun Microsystems, TIBCO Software "Web Services Eventing", pp. 1-2 Aug. 1, 2004 http://www-128.ibm.com/developerworks/webservices/library/specification/ws-eventing/.

* cited by examiner

*Primary Examiner*—Hyung S Sough
*Assistant Examiner*—Abdou K Seye
(74) *Attorney, Agent, or Firm*—Workman Nydegger (57) ABSTRACT

Transferring events. A method may be practiced in a network environment including one or more interconnected systems. The method includes subscribing to receive an event stream from a sending system. Subscribing to receive an event stream includes sending a bookmark subscription. The bookmark subscription specifies events that should be sent from the sending system. The method further includes receiving an event from the sending system as dictated by the bookmark subscription. The method also includes receiving a bookmark from the sending system related to the events sent from the sending system.

12 Claims, 4 Drawing Sheets

EVENT BOOKMARKS

BACKGROUND

Background and Relevant Art

Computers and computing systems have affected nearly every aspect of modern living. Computers are generally involved in work, recreation, healthcare, transportation, entertainment, household management, etc. The functionality of computers has also been enhanced by their ability to be interconnected through various network connections.

Computers generally execute instructions where the instructions are able to take into account internal and external inputs. For example, a computer instruction may be executed depending on how previous instructions have been executed. Computer instructions may also be executed in a fashion that takes into account various external parameters such as user inputs, sensor inputs, data received from a networked computer, etc.

Understandably, computers may have errors occur when executing instructions. Errors may occur as the result of unexpected inputs or un-received data, bugs in the computer instructions, and even environmental factors that affect computer hardware including heat and energy radiation.

Many computer programs include functionality for generating an event. Events are indicators that an occurrence has taken place at a computer system. Events may be generated when errors occur. Additionally, events may be generated for other reasons such as to indicate that data has been received, instructions have been executed, an input has been received, etc.

Events may be particularly useful in diagnosing server problems. For example, events or event logs may be generated locally at a server and may be used to diagnose problems or to facilitate recovery of the server. Exemplary servers that use event include Windows servers, web servers, SQL servers, file servers and the like.

Events may include complex or technical information that the average computer user does not know how to address. Often, a computer user will provide the event to a network administrator or other technical support to provide debugging based on the information in the event. In one example, the network administrator may examine the event on the computer on which the event was generated. This may be inconvenient in that it requires the network administrator to physically locate themselves at the machine where the event was generated and may cause strain on network administrator resources when the network administrator services a large number of individual machines or machines that are located in a geographically large area.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment may be a method of transferring events. The method may be practiced in a network environment including one or more interconnected systems. The method includes subscribing to receive an event stream from a sending system. Subscribing to receive an event stream includes sending a bookmark subscription. The bookmark subscription specifies events that should be sent from the sending system. The method further includes receiving an event from the sending system as dictated by the bookmark subscription. The method also includes receiving a bookmark from the sending system related to the events sent from the sending system.

Another embodiment includes an alternate method of transferring events. The method may be practiced for example, in a network environment including one or more interconnected systems. The method includes receiving a subscription to an event stream from a receiving system. Receiving the subscription to the event stream includes receiving a bookmark subscription. The bookmark subscription specifies events that should be sent to the receiving system. The method further includes sending an event to the receiving system as dictated by the bookmark subscription. The method also includes sending a bookmark to the receiving system related to event sent to the receiving system.

One embodiment may be a computer system for receiving and processing events generated at a sending system and sent to the computer system. The computer system includes a processor configured to run program modules. The computer system further includes a storage medium configured to store data and program modules. The storage medium includes one or more program module configured to subscribe to receive an event stream from a sending system. Subscribing to receive an event stream comprises sending a bookmark subscription. The bookmark subscription specifies events that should be sent from the sending system. The one or more program modules are further configured to receive an event from the sending system as dictated by the bookmark subscription. The one or more program modules are also configured to receive a bookmark from the sending system related to the event sent from the sending system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments herein may comprise a special purpose or general-purpose computer including various computer hardware, as discussed in greater detail below.

One embodiment described herein provides a mechanism for transferring events between systems using an event stream such that events occurring at a sending system can be transferred to a receiving system. At the receiving system, the events can be processed so as to provide troubleshooting, system restores and other administrative functions. One mechanism described herein includes functionality for resuming an event stream after an event stream transfer has been interrupted between systems. Event streams may be interrupted due to system crashes and failures, or other issues. One embodiment includes transferring bookmarks in conjunction with transferring events such that a receiving system can maintain a bookmark related to the last event or group of events that was received from a sending system. In one exemplary embodiment, the sending system can generate a bookmark at any time based on the event stream. When an event stream is interrupted, the receiving system can send a bookmark subscription that includes a bookmark related to the last event received by the receiving system to the sending system. The sending system can then correlate the bookmark sent by the receiving system to events maintained by the sending system such that any events not received by the receiving system can be sent again by the sending system.

Figure 1A:
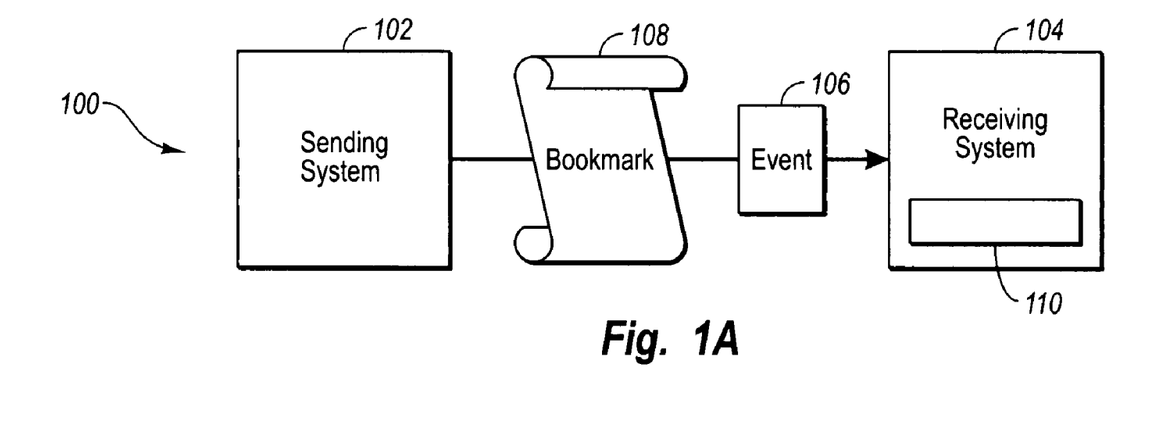
FIG. 1A illustrates a topology including sending and receiving systems configured to transfer events.

Turning now to FIG. 1 an example is illustrated where a sending system 102 communicates with a receiving system 104 to transfer events 106. In the example shown the sending system 102 transmits an event 106 to the receiving system 104. In conjunction with sending the event 106, the sending system 102 also sends a bookmark 108, related to the event 106, to the receiving system 104. In one embodiment, the bookmark 108 may be generated on the fly at the sending system 102. This allows a bookmark 108 to be customized to identify an event 106 or point of time in an event stream. By generating bookmarks 108 on the fly, the sending system 102 does not have to clean up any stored bookmarks 108 should an interruption occur in the event stream and when the receiving system 104 does not reconnect to the sending system 102.

The sending system 102 maintains a cache of information including previously sent events 106. The cache may include one or more logs, each having a unique log name and/or path, storing individual events 106. In one embodiment, each event 106 has an identifier, such as a number or name, by which it can be referenced. The previously sent events 106 and bookmarks 108 can be correlated such that bookmarks 108 are related to events 106. No specific correlation is required and several different alternative embodiments have proven effective. For example, a bookmark 108 may contain a specific reference to an event 106 that has been sent to a receiving system 104. The reference may also include a reference to a log such as when more than one log is included on the sending system 102. Alternatively, the bookmark 108 may contain a specific reference to the next event 106 that is to be sent to the receiving system 104. In other words, a bookmark 108 may contain a reference to an event 106 that has not been sent to the receiving system 104. The receiving system 104, in this case, will receive a bookmark 108 with a specific reference to an event 106 that the receiving system 104 has not yet received.

When the receiving system 104 receives the event 106 and the bookmark 108, the bookmark 108 may be initially stored in a volatile storage location such as system memory as will be discussed in more detail below. However, the receiving system 104 should at some point store the bookmark 108 in a non-volatile or persistent storage location 110 such that should the receiving system 104 experience a failure or system crash, the receiving system 104 will nonetheless have a persistently stored copy of the bookmark 108.

The receiving system 104 may store the bookmark 108 in persistent storage 110 according to a number of alternative embodiments. For example, in one embodiment the bookmark 108 may be stored in persistent storage 110 in response to receiving the bookmark 108 from the sending system. In other words, as soon as the receiving system 104 receives the bookmark 108, the receiving system 104 implements steps and procedures to store the bookmark 108 in the persistent storage 110. Embodiments implementing an act of storing a bookmark 108 in persistent storage 110 in response to receiving the bookmark 108 from the sending system 102 may be embodiments where after a system crash or system failure the system needs to be able to be restored and to process events relatively quickly. For example, an enterprise may have a contractual obligation to alert systems or individuals when there is a system crash or failure. If a receiving system 104 that processes events 106 pointing to other system failures fails and must process a number of events before being able to process the event 106 indicating the other system failure, the enterprise may not be able to meet its contractual obligations by alerting the appropriate individual or system within a contractually agreed upon time limit.

In other alternative embodiments when time is less of the essence other procedures and mechanisms can be used for storing the bookmark 108 to persistent storage 110. For example, in one alternative embodiment, the bookmark information may be stored in persistent storage 110 in response to processing events in received in conjunction with the bookmark 108. In other words, once an event 106 has been processed by the receiving system 104 the bookmark 108 sent in conjunction with the event 106 may then be stored in the persistent storage 110. In yet another alternative embodiment, the bookmark 108 may be stored in persistent storage 110 at a predetermined interval. In other words, after a given amount of time has elapsed, the bookmark 108 may be stored in the persistent storage 110.

In another alternative embodiment, bookmarks 108 may be saved to persistent storage 110 depending on the event 106 or nature of the event 106. For example, it may be harmful to process an event 106 at the receiving system 104 more than once. When such an event 106 is identified, the corresponding bookmark 108 is stored to persistent storage 110 to ensure that the event 106 will not be sent from the sending system 102 again when an interrupted event stream is reconnected to the receiving system 104. Other bookmarks 108 corresponding to more harmless events 106 when processed in duplicate do not necessarily need to be stored to persistent storage 110. Other characteristics of events 106 may be used to determine when to store corresponding bookmarks 108.

Each of the preceding embodiments describing storage of the bookmark 108 in persistent storage 110 requires various engineering tradeoffs and optimizations. For example, in the first example illustrated, storing each bookmark 108 in storage 110 when it is received allows for faster system recovery, but at the cost of requiring a large number of writes to the persistent storage 110 which may burden certain system resources. In contrast, the latter example illustrated above reduces the number of writes to persistent storage 110 but may require the receiving system 104 to receive duplicate alerts 106 and to process duplicate alerts 106. Notably, the embodiments described can be used in some combination with one another. For example, a rule may specify that bookmarks 108 are stored to persistent storage 110 depending on a type of event 106 and at a given interval.

The receiving system 104 does not need to maintain a cache of bookmarks 108 but rather can maintain only the latest bookmark 108 received from the sending system 102. Further, each bookmark may reference a single event or a group of events. Thus, when recited herein that a bookmark is received in conjunction with an event, such recitation does not require a one to one relationship, but rather allows for a single bookmark to correlate to a group of events.

Figure 1B:
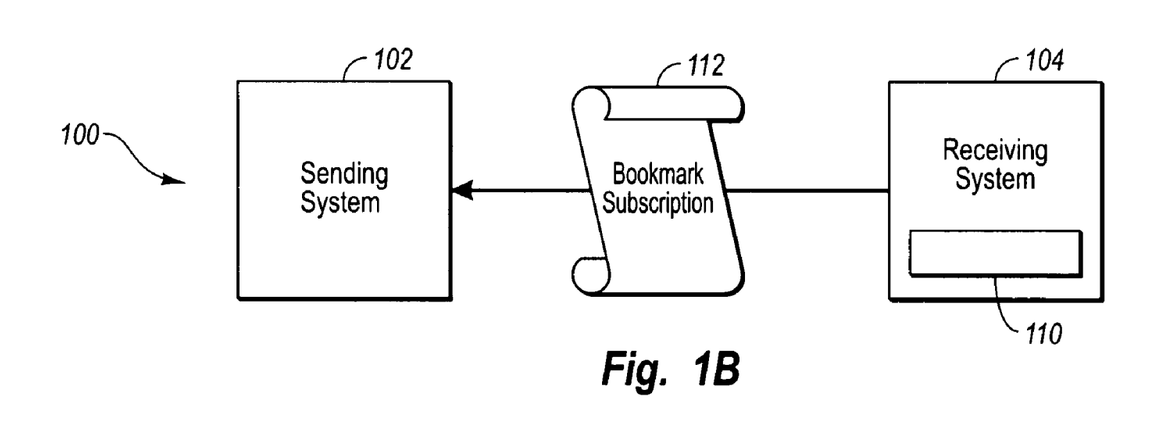
FIG. 1B illustrates a topology including sending and receiving systems configured to transfer events.

The receiving system 104 may initiate sending of events 106 and bookmarks 108 from the sending system 102 as illustrated in FIG. 1B. FIG. 1B illustrates the receiving system 104 sending a bookmark subscription 112 to the sending system 102. Sending the bookmark subscription 112 may be done as a part of a process of subscribing to receive events from the sending system 102.

The bookmark subscription 112 may include a request to receive bookmarks with events from the sending system 102. This type of request may be used as an initial request when no bookmarks have been received by the receiving system 104 and/or when the receiving system 104 and sending system 102 are establishing an initial relationship to transfer events. The bookmark subscription 112 may include bookmarks 108 (FIG. 1A) previously received. This embodiment may be used to resume an event stream from a point in time when the event stream was interrupted between the sending system 102 and the receiving system 104. For example, the bookmark subscription 112 may be an originating bookmark that includes an indication to the sending system 102 that the receiving system 104 would like to subscribe to events generated at the sending system 102.

The bookmark subscription 112 sent by the receiving system 104 to the sending system 102 may specify that bookmarks 108 should be sent with events 106 sent from the sending system 102. As described above, the bookmark subscription 112 sent from the receiving system 104 to the sending system 102 may include an indication that specifies what events should be received from the sending system 102. For example, the bookmark subscription 112 sent from the receiving system 104 may specify that events sent from the sending system 102 should include events occurring at a time earlier in time than when the bookmark subscription 112 is sent from the receiving system 104. In other words, the receiving system 104 may send a bookmark subscription 112 that specifies a desire to receive one or more earlier occurring events. This may be done, for example, to recover from a system crash or other failure. In one more specific example of this embodiment, the bookmark subscription 112 sent from the receiving system 104 may specify that the sending system 102 should send events occurring since the last boot of the sending system 102.

Alternative embodiments may specify a future or present time when events should be sent from the sending system 102. For example, the bookmark subscription 112 sent by the receiving system 104 may specify that the sending system 102 should send events occurring at or after a predetermined time. In other words, the bookmark subscription 112 may specify a particular time and/or date when the sending system 102 should commence sending events to the receiving system 104.

As described previously in conjunction with the description of FIG. 1A, but now with reference to the bookmark subscriptions 112 sent by the receiving system 104 to the sending system 102, various alternative embodiments may be effectively used to specify what the events 106 are to be sent from the sending system 102 to the receiving system 104. Illustratively, the bookmark subscription 112 may specify that the sending system 102 should send events according to one or more specific events referenced in a bookmark 108 included in the bookmark subscription 112. The specific events referenced in the bookmark 108 of the bookmark subscription 112 may be, for example, a specific reference to the last event that was successfully received by the receiving system 104, or may be a specific reference to the next event expected by the receiving system 104. For example, one or more specific events referenced in the bookmark 108 may specify the next event received so as to initiate sending of events including the next event specified in the specific reference, from the sending server 102. Alternatively, one or more specific events referenced in the bookmark 108 may specify a received event so as to initiate sending of events from the sending server occurring subsequent to the received event specified in the bookmark 108.

Figure 2:
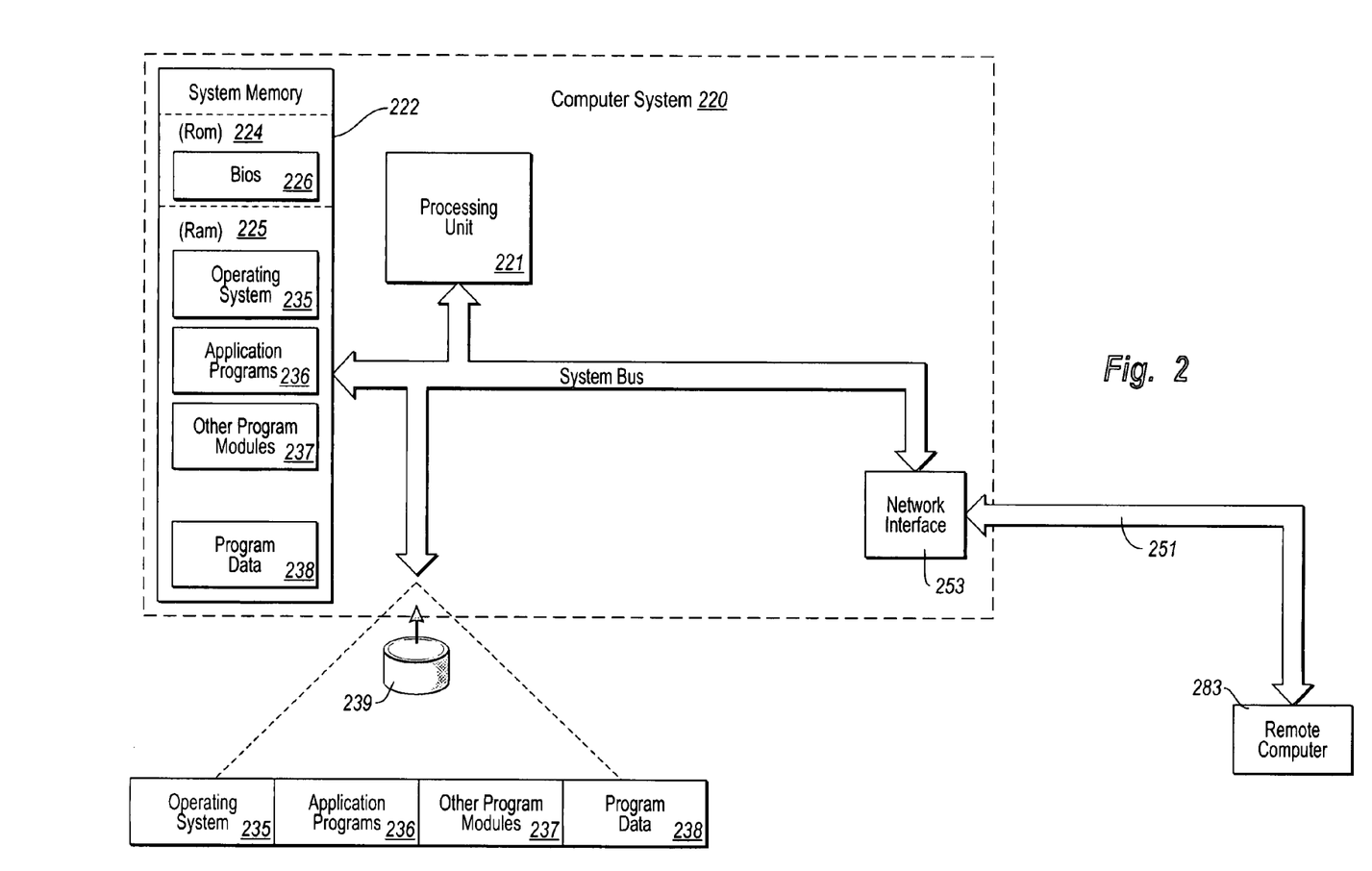
FIG. 2 illustrates a system overview of a receiving system.

Referring now to FIG. 2, an exemplary computer system 220 is illustrated. The computer system 220 may include functionality for receiving events from a sending system, such as the remote computer system 283. The computer system 220 may include a processor 221. The processor 221 is configured to operate on computer executable instructions. For example, the processor may be configured to run instructions stored in the BIOS 226 in ROM 224, as part of an operating system 235 and various program modules including application programs 236 and other program modules 237. These program modules may be stored on non-volatile persistent storage such as a hard disk 239 or other media where they may be loaded into system memory 222 for execution by the processor.

The computer system 220 also includes, as alluded to above, storage media configured to store data and program modules. For example, application programs 236 can be stored on the hard drive 239 where they can be loaded into the RAM 225 of the system memory 222. Similarly, program data 238 may be stored on the hard drive 239 and stored in the RAM 225 of the system memory 222. Additionally, events 106 (FIG. 1A) and bookmarks 108 can be stored in volatile memory such as is often employed for RAM 225 and later stored to non-volatile persistent memory, such as the hard drive 239.

A storage medium may include one or more program modules 237 configured to subscribe to receive an event stream from a sending system 102 (FIG. 1B). Subscribing to receive an event stream includes sending a bookmark subscription 112 where the bookmark subscription 112 specifies events 106 (FIG. 1A) that should be sent from the sending system. The one or more program modules 227 may be further configured to receive events 106 from the sending system 102 as dictated by the bookmark subscription 112 and to receive a bookmark 108 from the sending system 102 related to an event 106 sent from the sending system 102.

In some embodiments, the sending system 102 may be remote computer system 283 connected to the computer system 220 via a network interface 253 and network connection 251. The network connection 251 may be any of the various network connections that exist at the present time or may exist in the future. Present connections include Bluetooth connections, wired and wireless connections and various other connections. However, embodiments are not limited to the network connections recited herein, but may function with other, yet undiscovered connections.

As mentioned previously herein, when a bookmark 108 is received, it may be initially stored in volatile storage. However, it is desirable to store the bookmark 108 in a persistent storage in case of a system crash or other occurrence that may cause the volatile storage to lose any stored information. As such, the program modules 237 may include functionality for storing the bookmark 108 in persistent storage, such as at the hard drive 239 or other appropriate persistent storage.

For example, the one or more program modules 237 may further be configured to receive the bookmark 108 in volatile storage and to store the bookmark 108 in persistent storage 10 in response to receiving the bookmark 108. This embodiment has some overhead costs, but allows event information to be quickly recovered after system failures.

In an alternative embodiment, the one or more program modules 237 may be further configured to receive the bookmark 108 in volatile storage and to store the bookmark 108 in persistent storage 110 in response to processing events 106 received in conjunction with the bookmark 108. In other words, once a received event 106 is processed, the accompanying bookmark 108 may be stored in persistent storage 110.

In yet another alternative embodiment, the one or more program modules 237 may be configured to receive the bookmark 108 in volatile storage and to store the bookmark 108 in persistent storage 110 at a predetermined interval. This embodiment allows for engineering trade-offs by setting the latency to an acceptable level to reduce overhead costs such as writes to disk.

In yet another alternative embodiment, the one or more program modules 237 may be configured to receive the bookmark 108 in volatile storage and to store the bookmark 108 in persistent storage 110 depending on the event 106. For example, as described previously herein, when getting a duplicate of an event 106 is harmful, a bookmark 108 may be stored to persistent storage 110 to ensure that duplicates of the event 106 are not received.

Figure 3:
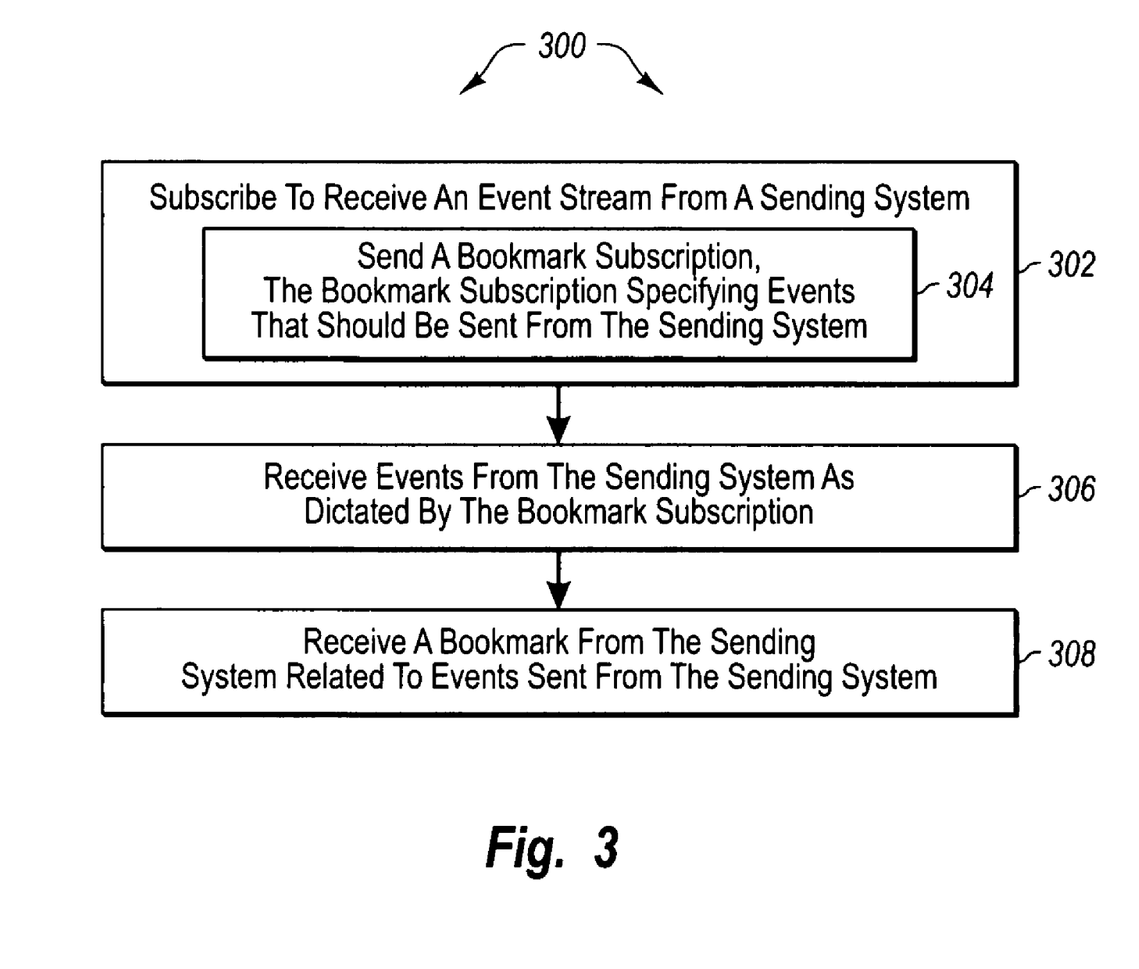
FIG. 3 illustrates a method of transferring events.

Referring now to FIG. 3, a method of transferring events is illustrated. The method may be practiced, for example, in a network environment including one or more interconnected systems. The method 300 includes an act of subscribing to receive an event stream from a sending system (act 302). Subscribing to receive an event stream (act 302) may include sending a bookmark subscription (act 304) the bookmark subscription specifying events that should be sent from the sending system.

In one embodiment, the bookmark subscription included in the act of sending a bookmark subscription (act 304) specifies that bookmarks should be sent with the events. In other words, a bookmark subscription 112 (FIG. 1B) may be used by a receiving system 104 to indicate to a sending system 102 that the receiving system desires to receive bookmarks 108 (FIG. 1A) with events 106 received from the sending system 102.

Subscribing to receive an event stream from a sending system (act 302) may be accomplished in one embodiment by using Web Services. Web Services is a standardized way of integrating applications. Standardized XML documents can be used with SOAP (Simple Object Access Protocol) messages and WSDL (Web Services Description Language) descriptions to integrate applications without an extensive knowledge of the applications being integrated. Thus, in one embodiment, the subscription may be transmitted using a "subscribe" operation using a SOAP message.

An exemplary SOAP message for subscribing to an event stream is as follows:

| (1) | <s:Body> |
|---|---|
| (2) |    <wse:Subscribe> |
| (3) |       <wse:Delivery> |
| (4) |          ... |
| (5) |          <wsman:SendBookmarks/> |
| (6) |       </wse:Delivery> |
| (7) |    </wse:Subscribe> |
| (8) | </s:Body> |

Line 5 above illustrates a command included in the soap message instructing the sending system 102 to include bookmarks 108 when events 106 are sent to the receiving system 104.

The bookmark subscription included in the act of sending a bookmark subscription (act 304) may specify that events 106 sent from the sending system should include events occurring at a time earlier in time than when the bookmark subscription 112 is sent in the act of sending a bookmark subscription (act 304). For example, the bookmark subscription 112 (FIG. 1B) from the receiving system 102 may include information specifying that the receiving system 104 desires to receive events 106 that have previously occurred. This may be accomplished by specifying an event 106 by a serial number or other logical pointer, by specifying a time at or after which the event was generated, or other such indications. One specific example includes the bookmark subscription 112 specifying that the sending system 104 (FIG. 1A) should send events occurring since the last boot of the sending system 104.

The bookmark information sent in the act of sending a bookmark subscription (act 304) may specify a time at or after or time period between when events 106 generated at the sending system should be sent. For example, in one alternative embodiment, the bookmark subscription 112 (FIG. 1B) sent in the act of sending a bookmark subscription (act 304) specifies that the sending system 102 should send events occurring at or after a predetermined time. Alternatively, the receiving system 104 may specify a time period during which events should be sent from the sending system 102.

In one embodiment, the bookmark information sent in the act of sending a bookmark subscription (act 304) specifies that the sending system should send events according to one or more specific events referenced in the bookmark subscription. Stated differently, the bookmark subscription 112 (FIG. 1B) may make a specific reference related to an event that is desired by the receiving system. This may be accomplished by including a bookmark 108 previously received in a previous bookmark subscription 112. The specified event 106 and subsequent events can then be sent as shown in FIG. 1A from the sending system 102 to the receiving system 104. As described above, a bookmark 108 may be sent as part of the bookmark subscription where the bookmark 108 references a specific event 106. This may occur when a receiving system 104 has received an event stream including events 106 and corresponding bookmarks 108, but the event stream was interrupted. In this case, the bookmark subscription 112 may include a specific reference to the last known bookmark 108 from a previous delivery. For example, the following SOAP message may be sent to re-subscribe to an event stream when an event stream has been interrupted and the receiving system 104 has a bookmark 108 related to an event 106:

```
(1)     ...
(2)     <s:Body>
(3)         <wse:Subscribe>
(4)             <wse:Delivery> ... </wse:Delivery>
(5)             <wse:Expires> ... </wse:Expires>
(6)             <wse:Filter> ... </wse:Filter>
(7)             <wsman:Bookmark>
(8)                 ...last known bookmark from a previous delivery...
(9)             </wsman:Bookmark>
(10)            <wsman:SendBookmarks/>
(11)        </wse:Subscribe>
(12)    </s:Body>
```

In this example, the specific reference is shown at line 8.

The specific reference in the bookmark 108 does not need to specifically reference the particular event 106, but may instead reference related events such as those before or after the particular event 106. For example, in one embodiment, one or more specific events referenced in the bookmark may include the next event to be received so as to initiate sending of events including the next event specified in the bookmark 108 from the sending system 102. In other words, the specific reference references an event that it desired from the sending system 102. They may be done, in one embodiment, by including a logical pointer to the event. As stated previously, the sending system 102 may then send the event 106 pointed to and any subsequent events.

Alternatively, the one or more specific events referenced in the bookmark may specify an already received event so as to initiate sending of events from the sending server occurring subsequent to the received event specified in the bookmark. Stated differently, the receiving system 104 (FIG. 1B) may send a bookmark 108 in a bookmark subscription 112 to the sending system 102 indicating the last event 106 received by the receiving system 104. In response, the sending system 102, as shown in FIG. 1A, can send any events that have occurred or that occur in the future subsequent to the event specified in the bookmark 108 sent by the sending system 102 to the receiving system 104.

In conjunction with the act of subscribing to receive an event stream from a sending system (act 302), the method 300 may further include sending filter information specifying criteria for events to be sent from the sending system. Stated differently, the bookmark subscription 112 (FIG. 1B) sent by the receiving system 104 may include filter information specifying certain criteria for events. For example, the criteria may specify certain types of events or events generated by a particular application.

FIG. 3 further illustrates an act of receiving events from the sending system as dictated by the bookmark subscription (act 306). As discussed previously herein in more detail with the description of FIG. 1A, events 106 may be received by the receiving system 104 from the sending system 102.

FIG. 3 further illustrates an act of receiving a bookmark from the sending system related to events sent from the sending system (308). FIG. 1A illustrates how bookmarks 108 are received from the sending system 102 at the receiving system 104. A bookmark 108 may be sent from the sending system 102 using SOAP messages. The following is a SOAP message that may be used to transmit the bookmark 108 to the receiving system 104:

```
(1)     <s:Envelope
(2)         xmlns:s="http://www.w3.org/2003/05/soap-envelope"
(3)         xmlns:wsa="http://schemas.xmlsoap.org/ws/2004/08/addressing"
(4)         xmlns:wsman="http://schemas.xmlsoap.org/ws/2005/06/management">
(5)     <s:Header>
(6)         <wsa:To s:mustUnderstand="true">http://2.3.4.5/client</wsa:To>
(7)         ...
(8)         <wsman:Bookmark> xs:any </wsman:Bookmark>
(9)         ...
(10)    </s:Header>
(11)    <s:Body>
(12)        ...event content...
(13)    </s:Body>
(14)    </s:Envelope>
```

The method 300 illustrated in FIG. 3 may further include storing the bookmark in persistent storage in response to receiving the bookmark. As described above, and to create a system with fast recovery times from system crashes or other failures, The receiving system 104 may store a bookmark 108 in persistent storage when it is received. Storing in persistent storage allows for system recovery even when information is lost from a volatile storage. Notably, and as mentioned above, only a single bookmark needs to be stored in persistent storage at any given time.

In an alternative embodiment, the method 300 may include storing the bookmark in persistent storage in response to processing events received in conjunction with the bookmark. Thus, once an event is processed, the bookmark 108 related to the event 106 can be stored in persistent storage.

In yet another alternative embodiment that reduces system overhead, the method 300 may include storing the bookmark in persistent storage at a predetermined interval. For example, after a predetermined period of time has elapsed, a bookmark 108 may be stored in persistent storage.

Figure 4:
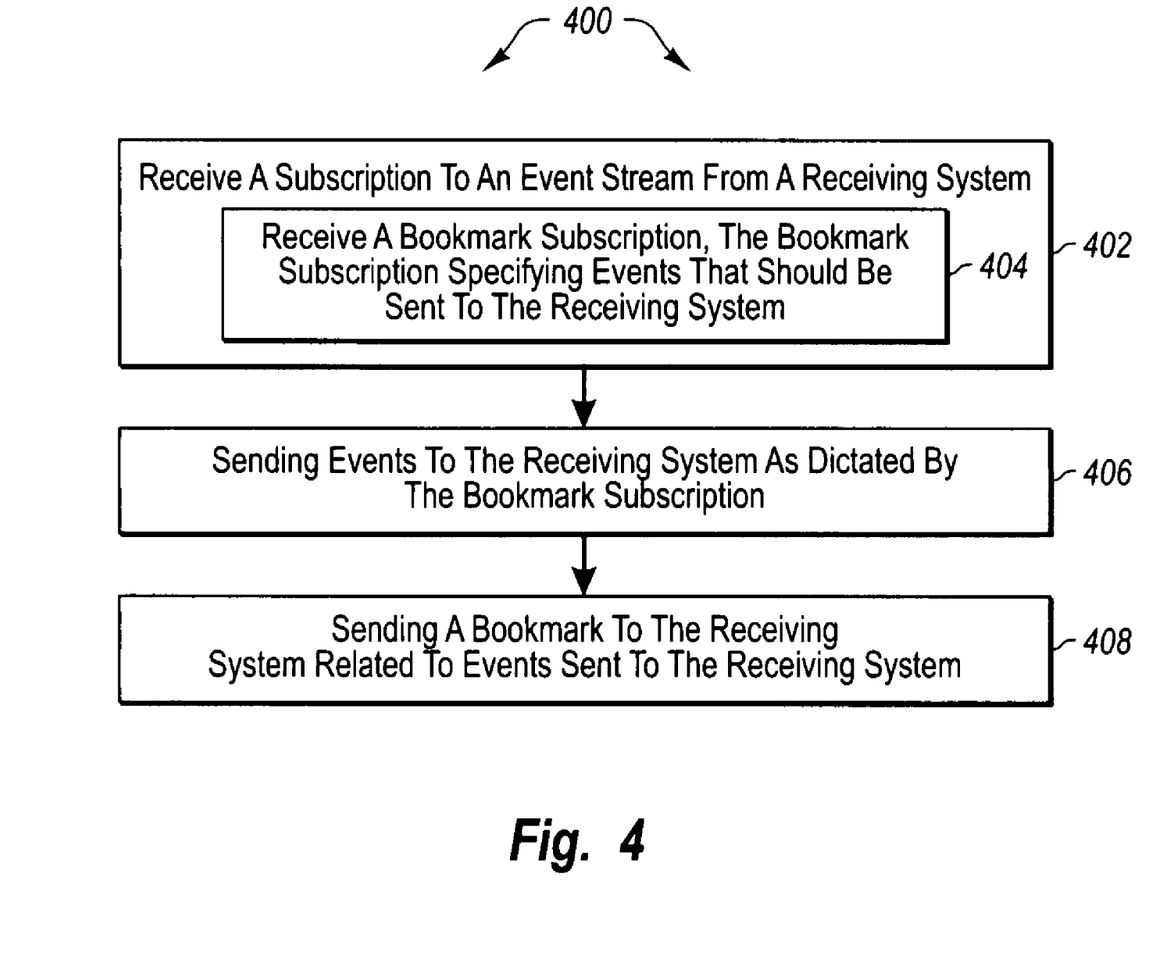
FIG. 4 illustrates a method of transferring events.

Another method of transferring events 400 is illustrated at FIG. 4. The method may be practiced, for example, in a network environment including one or more interconnected systems. The method includes an act of receiving a subscription to an event stream from a receiving system (act 402). Receiving the subscription to the event stream (act 402) includes receiving a bookmark subscription (act 404). The bookmark subscription specifies events that should be sent to the receiving system.

The bookmark subscription may specify that the sending system should send events according to one or more specific events referenced in the bookmark subscription. The one or more specific events referenced in the bookmark subscription may specify the next event to be received. The method 400 then further includes sending events including the next event specified from the sending server. Alternatively, the one or more specific events referenced in the bookmark subscription may specify a received event. The method then further includes sending of events from the sending server occurring subsequent to the received event specified in the bookmark information.

The method 400 further includes an act of sending an event to the receiving system as dictated by the bookmark subscription (act 406). Sending an event to the receiving system (act 406) is illustrated in FIG. 1A, where an event 106 is sent from the sending system 102 to the receiving system 104.

As illustrated in FIG. 4, the method 400 further includes sending a bookmark to the receiving system related to event sent to the receiving system (act 408). Sending a bookmark (act 408) is illustrated in FIG. 1A where a bookmark 108 is sent by the sending system 102 to the receiving system 104.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a network environment including a sending computing system and a receiving computing system, a method for resuming delivery of an event stream having one or more events comprising:
   the receiving computing system subscribing to receive an event stream from the sending computing system, wherein subscribing to receive an event stream comprises:
      sending from the receiving computing system to the sending computing system a first Web Service Eventing (WS-Eventing) subscribe message over SOAP that includes a bookmark subscription, the bookmark subscription specifying that each event of the event stream should be transmitted by the sending computing system with a bookmark;
   the receiving computing system receiving from the sending computing system an event of the event stream that includes a bookmark that uniquely identifies the event to the sending computing system;
   the receiving computing system storing the bookmark;
   in response to the event stream being interrupted such that the receiving computing system fails to receive further events of the event stream after receiving the event identified by the stored bookmark, the receiving computing system sending to the sending computing system a second WS-Eventing subscribe message over SOAP to subscribe to the event stream, the second WS-Eventing subscribe message including the stored bookmark and a bookmark subscription, the stored bookmark identifying a last known event of the event stream received by the receiving computer system;
   in response to sending the second WS-Eventing subscribe message, the receiving computing system again receiving events of the event stream, wherein the event of the event stream that is received first after sending the second subscribe message is either the last known event identified by the stored bookmark, or the event directly after the last known event identified by the stored bookmark.

2. The method of claim 1, wherein the bookmark comprises XML data.

3. The method of claim 1, wherein the bookmark subscription of the first subscribe message specifies that events sent from the sending system should include events occurring at a time earlier in time than when the bookmark subscription is sent.

4. The method of claim 1, wherein the bookmark subscription of the first subscribe message specifies that the sending system should send events occurring since the last boot of the sending system.

5. The method of claim 1, wherein the bookmark subscription of the first subscribe message specifies that the sending system should send events occurring at or after a predetermined time.

6. The method of claim 1, wherein the receiving computing system storing the bookmark comprises storing the bookmark in persistent storage.

7. The method of claim 1, wherein the receiving computing system stores the bookmark after processing the event received with the bookmark.

8. The method of claim 1, wherein the receiving computing system storing the bookmark comprises storing the bookmark in persistent storage at a predetermined interval.

9. The method of claim 1, wherein one or both of the bookmark subscriptions comprises sending filter information specifying criteria for events to be sent from the sending system.

10. In a network environment including a sending computing system and a receiving computing system, a method for resuming delivery of an event stream having one or more events comprising:
   the sending computing system receiving from the receiving computing system a first WS-Eventing subscribe message over SOAP that includes a bookmark subscription, the bookmark subscription specifying that each event of the event stream should be transmitted by the sending computing system with a bookmark;

the sending computing system sending, to the receiving computing system, the event stream by sending each event with a bookmark that uniquely identifies the event to the sending computing system wherein the sending computing system stores the bookmark;

the sending computing system receiving a second WS-Eventing subscribe message from the receiving computing system that again requests subscription to the event stream, the second WS-Eventing subscribe message including a last known bookmark that was last received by the receiving computer system and which was sent by the sending computing system in conjunction with a last known event of the event stream;

the sending computing system comparing the last known bookmark to stored bookmarks to determine which event of the event stream it represents;

upon determining which event of the event stream the last known bookmark represents, selecting either the event represented by the last known bookmark or the next event in the event stream after the event represented by the last known bookmark; and the sending computing system again sending the event stream to the receiving computing system beginning with the selected event such that events of the event stream prior to the selected event are not resent to the receiving computer system.

11. The method of claim 10, wherein each bookmark comprises XML data.

12. A computer readable storage medium that stores computer executable instructions which when executed by a processor perform the method of either claim 1 or 10.

* * * * *